United States Patent
Snyder et al.

(10) Patent No.: US 7,222,053 B2
(45) Date of Patent: May 22, 2007

(54) EVENT-DRIVEN PORTABLE DATA BUS MESSAGE LOGGER

(75) Inventors: Christopher David Snyder, Schnecksville, PA (US); David Keith Troupe, Breinigsville, PA (US)

(73) Assignee: Mack Trucks, Inc., Allentown, PA (US)

( * ) Notice: Subject to any disclaimer, the term of this patent is extended or adjusted under 35 U.S.C. 154(b) by 171 days.

(21) Appl. No.: 10/888,009

(22) Filed: Jul. 12, 2004

(65) Prior Publication Data

US 2006/0010356 A1 Jan. 12, 2006

(51) Int. Cl.
*G06F 15/00* (2006.01)
*G06F 11/00* (2006.01)

(52) U.S. Cl. ............... 702/187; 702/188; 714/56

(58) Field of Classification Search ........... 702/180, 702/187, 188, 183, 184, 186, 182; 709/200, 709/223, 226, 230; 714/56, 57; 707/4, 10; 701/29, 35

See application file for complete search history.

(56) References Cited

U.S. PATENT DOCUMENTS

| | | | |
|---|---|---|---|
| 4,694,408 A | 9/1987 | Zaleski | |
| 4,817,118 A | 3/1989 | Wilburn et al. | |
| 5,034,889 A | 7/1991 | Abe | |
| 5,313,388 A | 5/1994 | Cortis | |
| 5,345,383 A | 9/1994 | Vance | |
| 5,802,545 A * | 9/1998 | Coverdill | 701/35 |
| 5,916,287 A | 6/1999 | Arjomand et al. | |
| 5,957,986 A | 9/1999 | Coverdill | |
| 6,073,063 A | 6/2000 | Leong Ong et al. | |
| 6,349,250 B1 | 2/2002 | Hart et al. | |
| 6,356,823 B1 | 3/2002 | Iannotti et al. | |
| 6,363,304 B1 | 3/2002 | Ramsey | |
| 6,445,986 B1 | 9/2002 | Costello | |
| 6,622,070 B1 | 9/2003 | Wacker et al. | |
| 6,629,029 B1 | 9/2003 | Giles | |
| 6,636,789 B2 | 10/2003 | Bird et al. | |
| 6,701,234 B1 | 3/2004 | Vogelsang | |
| 6,725,218 B1 * | 4/2004 | Podanoffsky | 707/10 |
| 2002/0002430 A1 | 1/2002 | Nada | |
| 2002/0143447 A1 | 10/2002 | Miller | |
| 2004/0039503 A1 | 2/2004 | Doyle | |

* cited by examiner

*Primary Examiner*—Bryan Bui
(74) *Attorney, Agent, or Firm*—Martin Farrell

(57) ABSTRACT

A event-driven portable data bus message logger includes an event message receiver for receiving an event message including an event field, an event message storage operably connected to the event message receiver for storing the event message, a data bus message receiver for receiving data bus messages including a data field and a data checksum, a comparator for comparing a current data field of a current data bus message to the event field; and a trigger operably connected to the comparator for storing the current data bus message, a preceding data bus message, and a subsequent data bus message in a snapshot storage if the current data field is substantially similar to the event field.

26 Claims, 6 Drawing Sheets

EVENT-DRIVEN PORTABLE DATA BUS MESSAGE LOGGER

BACKGROUND OF THE INVENTION

1. Field of the Invention

The invention relates to a data bus message logger and, in particular, to event-driven portable data bus message loggers that utilize redundancy to verify error codes.

2. Description of the Related Art

Control systems in automotive vehicles may be designed to produce error codes to aid in diagnosing a source of a malfunction. Computer controls that produce such error codes may control an engine, so-called engine control modules (ECM), a transmission (transmission control modules (TCM)), a power train (power train control modules (PCM)), or an entire vehicle (vehicle control modules (VCM)). One or more of these control modules may be present in a vehicle. Control modules may communicate with various vehicle subsystems under their control, and with each other, over a bus. In some cases signals from various control modules are multiplexed over the same bus. In other cases individual control modules have their own buses.

In the case of a malfunction, subsystems under the control of a control module may send error codes back to the control module. In the alternative, the control module may monitor signals representative of the subsystems' status or activities and send its own error code to a memory location, where it may be accessed by diagnostic personnel. The subsystems may be sensors, control systems, or actuators.

A sensor or a control module may produce an error code, called 'setting a code', if a parameter sensed by the sensor appears to be out of an expected range. It may be difficult to tell, however, whether a parameter that is outside of an expected range is the result of another component malfunction or a malfunction of the sensor itself. One of the more time-consuming aspects of diagnosing a malfunction is determining whether the signal from a sensor ought to be trusted, i.e. the component is bad, or whether the sensor itself is malfunctioning. Such determinations often require a laborious trouble-shooting process. With any trouble-shooting processes, there is always a risk that errors are occurring in the analysis tools themselves, rather than, or in addition to, malfunctions in the underlying components.

If a malfunction is intermittent, that is, if the malfunction occurs due to a confluence of several relatively rare events, it can become difficult to reproduce the malfunction in the first place, let alone decide whether there is truly a component malfunction or if the sensor itself is producing faulty information. Since an error code is an interpretation of a signal, it adds a further degree of uncertainty to the diagnostic process. The error code, for example, may have been garbled during translation of an otherwise representative sensor signal.

A checksum is often appended to a string of bits to offer a warning if the string of bits is garbled during transmission. The checksum may, for example, be a sum of some or all of the bits being transmitted. If the checksum does not add up to the expected sum, therefore, there is a fairly good chance that one bit has been mis-transmitted, and the message is therefore erroneous. If the probability that an individual bit will be mis-transmitted is small, the probability that two bits will be mis-transmitted is the one-bit probability squared. Therefore the chances of two bits being transmitted erroneously, which would make the checksum look as though the string had not been garbled, is often neglected. A checksum can thus be a valuable diagnostic tool in itself.

A bus to which a control module is connected may have a diagnostic link over which a technician can gain access to the messages traveling the bus for review. Such links go by various names, Assembly Line Diagnostic Link (ALDL), Vehicle Diagnostic Link (VDL), and so on. In general, a diagnostic link may comprise a six- or eight-pin serial- or parallel-port connector into which a scanning type device may be plugged to receive diagnostic codes for review later or display. If the scanning device is reading the same codes that the control module is seeing, however, and the control module is garbling the error codes, it may be difficult to know what the true error code ought to have been, or what value the underlying activity really produced. A value may look alright, but with no sure knowledge of the underlying statistic it purports to represent it may be difficult to know for sure. A sensor value that looks alright may mask a symptom, leading to a true malfunction being overlooked or diagnosed incorrectly.

SUMMARY OF THE INVENTION

A primary object of the invention is to overcome the deficiencies of the related art described above by providing an event-driven portable data bus message logger. The present invention achieves these objects and others by providing an event-driven portable data bus message logger.

In several aspects, the invention may provide an event-driven portable data bus message logger. In particular, in a first aspect, an event-driven portable data bus message logger includes an event message receiver for receiving an event message including an event field, an event message storage operably connected to the event message receiver for storing the event message, a data bus message receiver for receiving data bus messages including a data field and a data checksum, a comparator operably connected to the event message storage and the data bus message receiver for comparing a current data field of a current data bus message to the event field, and a trigger operably connected to the comparator for storing the current data bus message, a preceding data bus message, and a subsequent data bus message in a snapshot storage if the current data field is substantially similar to the event field.

In a second aspect, a method of event-driven portable data bus message logging includes the steps of receiving an event message including an event field, storing the event message in an event message storage, receiving data bus messages including a data field and a data checksum, comparing a current data field of a current bus message to the event field, and storing the current data bus message, a preceding data bus message, and a subsequent data bus message in a snapshot storage if the current data field is substantially similar to the event field.

In a third aspect, a system for event-driven portable data bus message logging includes means for receiving an event message including an event field, means for storing the event message in an event message storage, means for receiving data bus messages including a data field and a data checksum, means for comparing a current data field of a current bus message to the event field, and means for storing the current data bus message, a preceding data bus message, and a subsequent data bus message in a snapshot storage if the current data field is substantially similar to the event field.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Since there is a small but finite possibility that a checksum may indicate an error code has been transmitted correctly even though two bits were mis-transmitted, it would be desirable if the error code could be stored along with the checksum verbatim, for analysis and review. It would further be desirable for the checksum to be available to verify that the formatting of the error code message is correct. Since a bus over which an event driven portable error message logger is collecting error messages may itself be garbling the error messages, it would be desirable if the event driven portable error message logger could read data bus messages from two different buses, or from two disparate locations on the same bus simultaneously, in order to check one message against the other.

Since the time or the order in which seemingly disparate sensor signals occur may be significant to a diagnosis of a malfunction, it would be desirable for an error code to be stored along with a time stamp indicating the time at which the error code was logged, so that the order in which events took place could be examined. Since error codes may evolve as a malfunction takes place, it would be desirable if some bus messages transmitted just before or just after an error code occurs were stored with the error code of interest, so that the details of a malfunction can be placed in a broader context of the conditions under which the vehicle was operating at the time.

Since an error code may be a result of a computer sensor or computational malfunction, as well as an actual component malfunction, it would be desirable if a message logger could log messages from two buses simultaneously, or from a bus and a sensor, so that one error code could be checked against the other. It would further be desirable if an alternate location could be provided at which the message logger could receive messages besides a diagnostic link port, so that messages derived at one location could be checked against messages derived at another.

Since it may not be cost effective to install extensive diagnostic equipment on every vehicle for possible use diagnosing a malfunction, it would be desirable for a portable event message logger to be plugged into diagnostic link temporarily to record data pertaining to bus activities, in order to diagnose a malfunction. Since a vehicle power failure or interruption generally clears any error codes that have been stored in a control module, it would be desirable for an event driven portable message logger to have an auxiliary source of power to protect the stored error codes from being deleted. Finally, it would be desirable if an event driven portable message logger could be sent to a customer to be installed temporarily on a vehicle, and then returned with logged messages.

Figure 1:
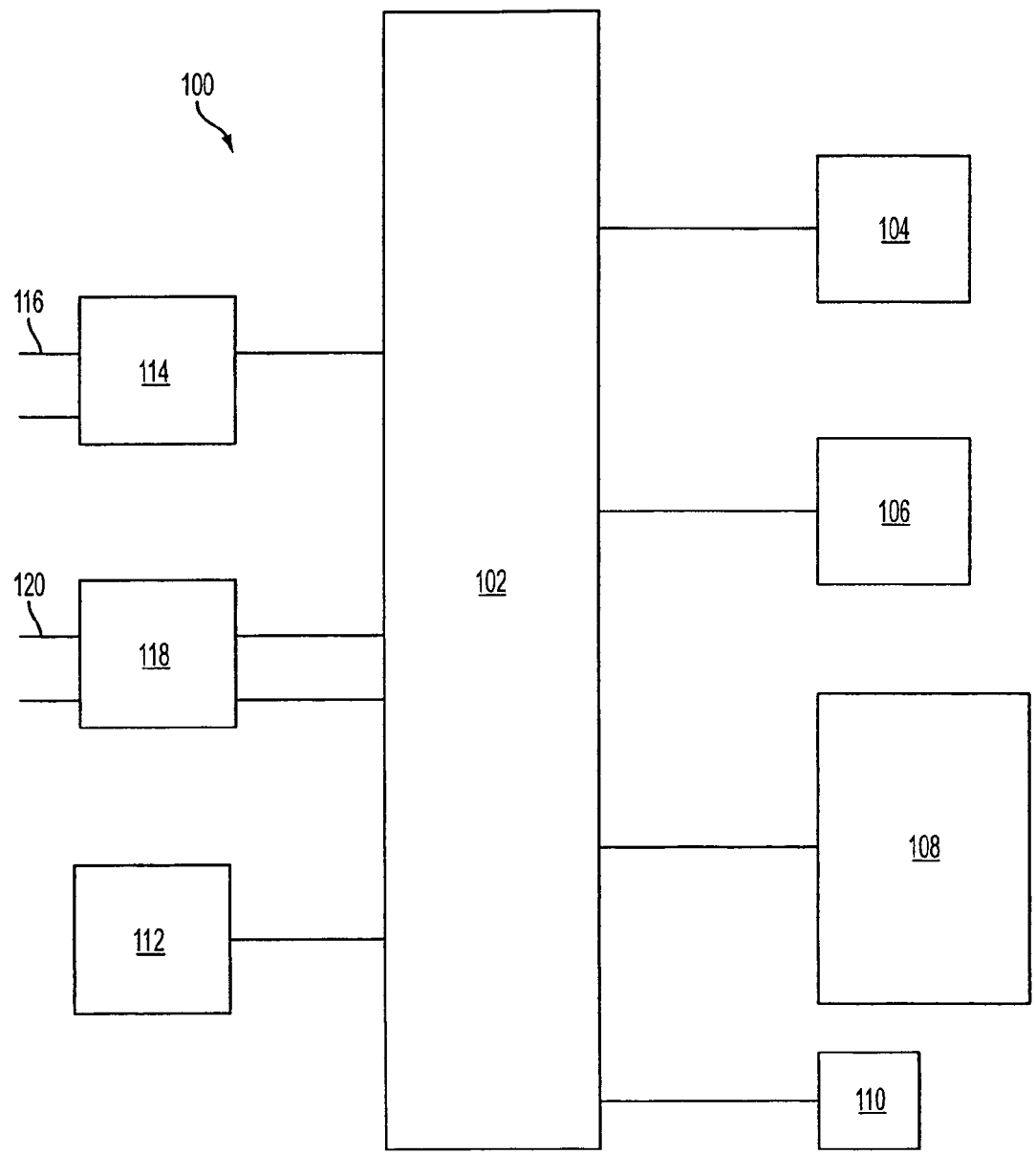
FIG. 1 is a schematic of the internal architecture of an event-driven portable data bus message logger according to a first embodiment of the invention.

In FIG. 1 is shown an event-driven portable data bus message logger 100 according to a first embodiment of the invention. Event-driven portable data bus message logger 100 may be a self contained data storage facility with volatile and non-volatile memory in which to store messages. A technician may use event-driven portable data bus message logger 100 to diagnose a vehicle malfunction by plugging event-driven portable data bus message logger 100 in at a port of diagnostic link and operating the vehicle. Event-driven portable data bus message logger 100 would look for particular error codes appearing on the bus and record them, along with at least one bus message immediately preceding the error code of interest and one bus message subsequent to the error code of interest.

In one embodiment, the complete error code, including a checksum or other data integrity tell-tale, could be recorded verbatim. Verbatim recording of error codes could allow a technician to note the presence of undetected garbling in the messages, as well as assess the efficacy of the data-verification methods that are being used. The messages may be error codes produced by a vehicle control module in response to an event, or they may be signals representative of the events themselves, on their way to the vehicle control module.

In particular, event-driven portable data bus message logger 100 may comprise a microprocessor 102 that will monitor data link messages and event parameters, record messages in a circular buffer until an event is triggered, store messages before, during and after the event, and activate an external event captured indicator after successful event capture. Event-driven portable data bus message logger 100 may also include a flash memory 104 for storing program software to control event-driven portable data bus message logger 100. Event-driven portable data bus message logger 100 may also include an electrically eraseable programmable read only memory (EEPROM) 106 for storing event trigger parameters, and a smart card data storage 108 to store event data. Event-driven portable data bus message logger 100 may also include an event captured indicator 110 to indicate that an event has been logged. Event-driven portable data bus message logger 100 may also include battery back up uninterruptable power supply 112 to maintain operations in the event of a vehicle power interruption. Event-driven portable data bus message logger 100 may also include a diagnostic connector, such as an RS232 or an RS485 serial port connector 114 to connect to a bus 116, such as a Society of Automotive Engineers (SAE) J1587 bus. Finally, event-driven portable data bus message logger 100 may also include a controller area network (CAN) transceiver 118 for connecting to a SAE J1939 bus 120.

Figure 2:
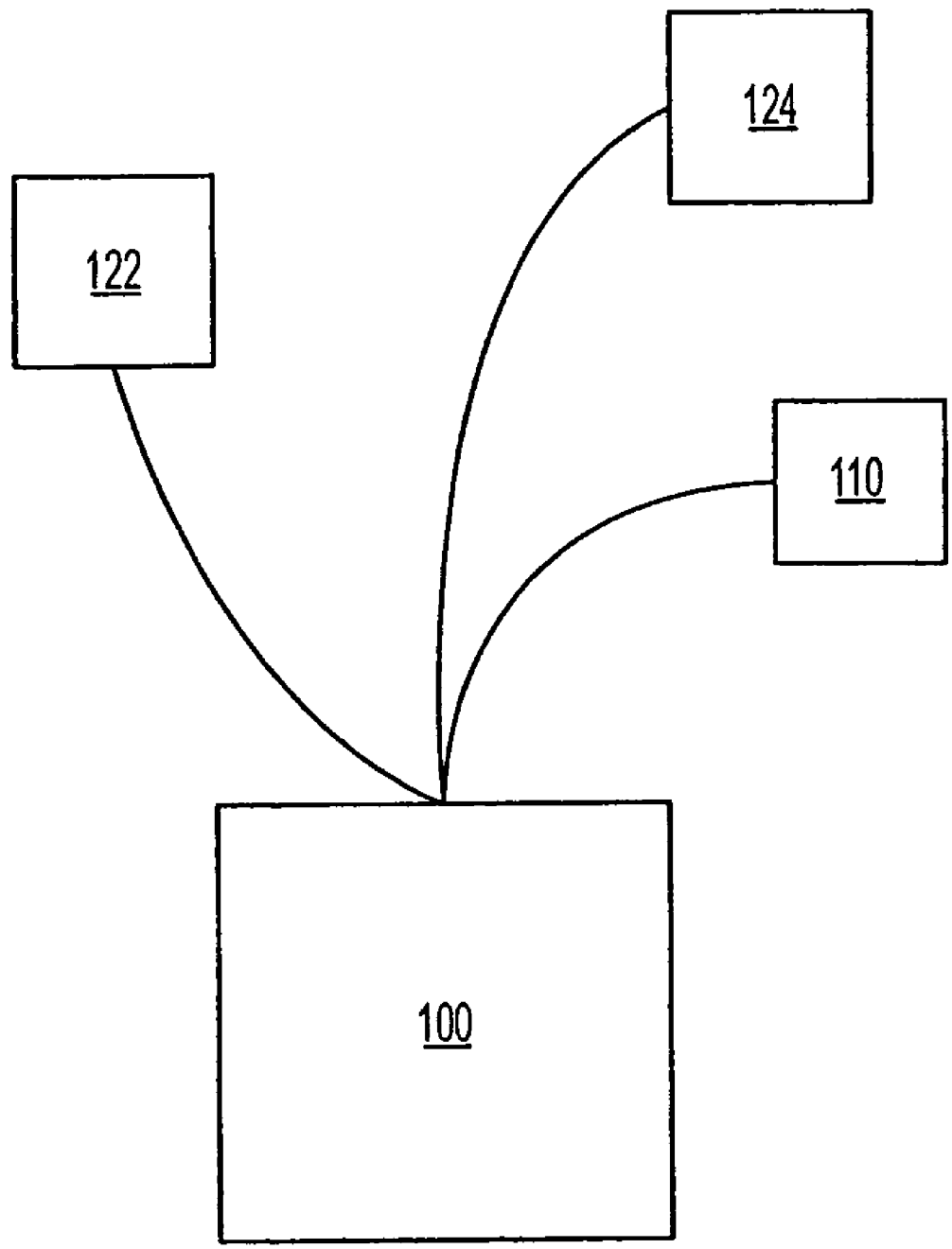
FIG. 2 is a schematic of the event-driven portable data bus message logger according to the embodiment shown in FIG. 1.

As shown in FIG. 2, event-driven portable data bus message logger 100 may include a manual trigger switch 122 for overriding automating logging of event messages, diagnostic connector 124, and an event captured indicator 110, which may be a light emitting diode (LED).

Figure 3:
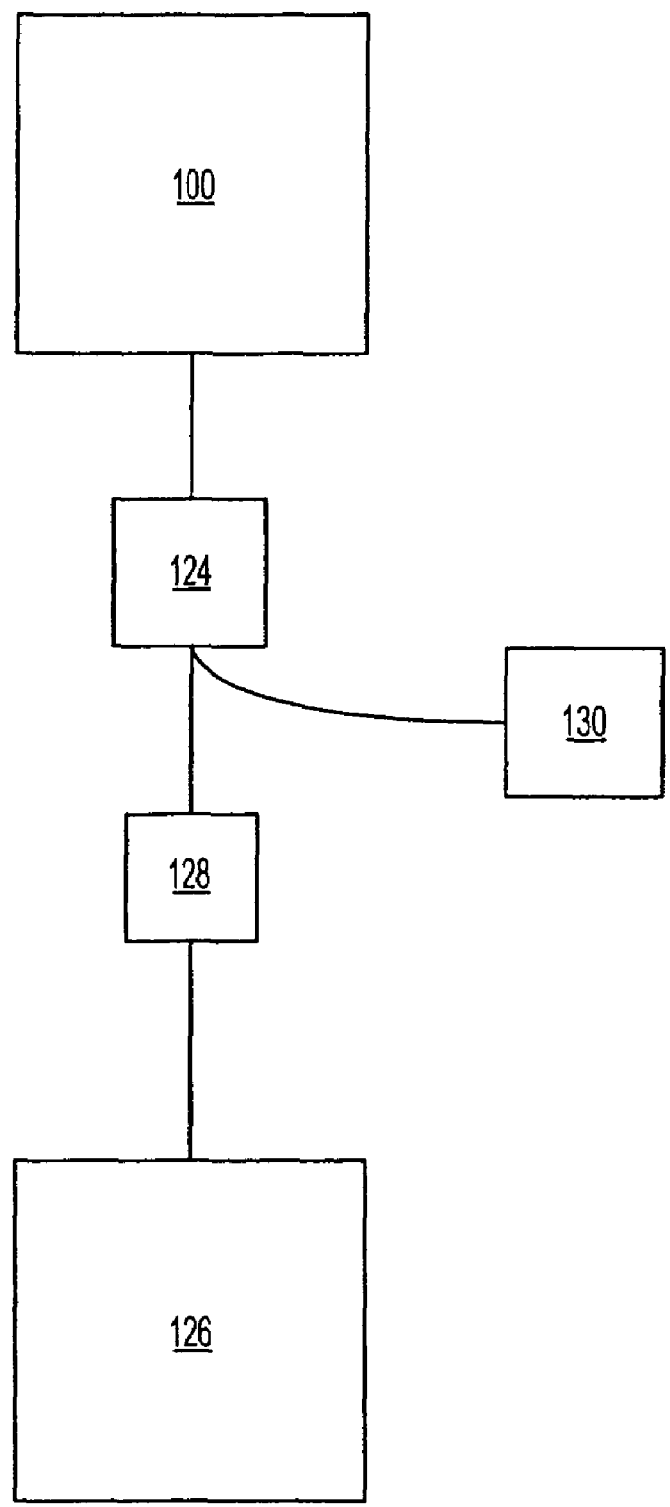
FIG. 3 is a schematic of the event-driven portable data bus message logger according to the embodiment shown in FIG. 1.

As shown in FIG. 3, events captured by event-driven portable data bus message logger 100 may be accessed and downloaded by technical personnel by connecting diagnostic connector 124 to an analysis tool 126, such as a PC-based device. An adaptor 128, such as an RP1210A adaptor, may be used to interface event-driven portable data bus message logger 100 to analysis tool 126. An external power source 130 may be necessary to drive event-driven portable data bus message logger 100 while stored events are being downloaded.

Figure 4:
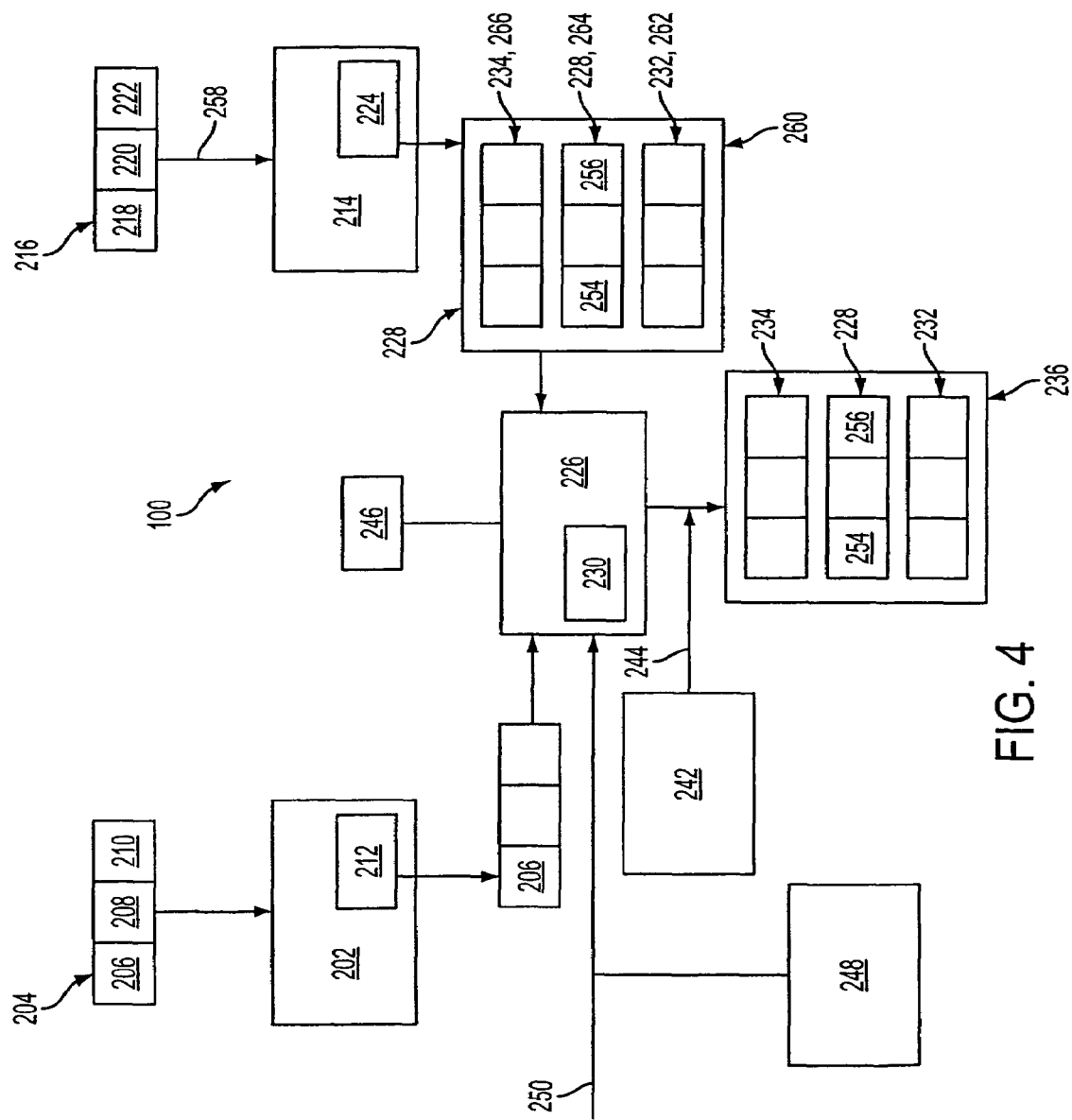
FIG. 4 is a schematic of the internal architecture of an event-driven portable data bus message logger according to a second embodiment of the invention.

In a second embodiment, shown in FIG. 4, event-driven portable data bus message logger 100 may include an event message receiver 202 for receiving an event message 204. In various embodiments, event message receiver 202 may be a keyboard, a port, or a downlink, such as a connection to a maintenance database of vehicle maintenance histories, or a transmitter placed at a location remote from a vehicle in which data bus message logger 100 is installed. Event message receiver 202 may be used by a technician to input an event message 204, such as a code the technician wants to monitor, or an entire table of codes. In one embodiment, event message 204 may be one of a table or list of codes used by an ECM to report various malfunctions. In this embodiment, event message 204 may be selected from a list of codes used by an ECM to report various malfunctions by the technician.

Event message 204 may include an event field 206. In this embodiment, event field 206 may be a string of bits, such as octal or binary symbols having a one-to-one correspondence with a similar field in an error code. In one embodiment, event message 204 may also include an event time stamp 208 or an event checksum 210 as well. In these embodiments, event time stamp 208 or an event checksum 210 may also be octal or binary symbols having a one-to-one correspondence with similar fields in an error code. In several embodiments, event message 204 may be an error code that a technician suspects will occur, or it may be a list of error codes, such as a list of all of the error codes a control module can produce.

In one embodiment, the service or maintenance histories of similar vehicles may be checked against a vehicle in which data bus message logger 100 is installed while undergoing testing to determine if similarities or correlations exist between different vehicles. A history or data base of codes set by similarly situated vehicles may be useful as a starting point when performing a diagnosis. Such a history, or a likely code to watch for, could be downloaded to event message receiver 202 prior to conducting a diagnostic regime.

An event message storage 212 may be operably connected to event message receiver 202 for storing event message 204. In one embodiment, event message 204 may be stored in event message storage 212 before a diagnostic regime is performed or the vehicle is placed in regular service. In various embodiments, event message storage 212 is an electrically eraseable programmable read only memory (EEPROM) or a smart data storage card. In one embodiment, event message storage 212 is remote from event-driven portable data bus message logger 100. This may be the case if, for example, event message 204 is downloaded to event-driven portable data bus message logger 100 over a wireless connection, or, in the alternative, error codes are uploaded to event-driven portable data bus message logger 100 over a wireless connection.

In one embodiment, event-driven portable data bus message logger 100 may be a thin client, with most of its software or hardware residing at a location remote from a vehicle being diagnosed. In one embodiment, event-driven portable data bus message logger 100 may be monitored over a wireless connection.

Event-driven portable data bus message logger 100 may also include a data bus message receiver 214 for receiving data bus messages 216. In several embodiments, data bus messages 216 may be error codes, sensor signals, clock signals, acknowledgment requests, status updates, or channel integrity verification signals. Each data bus message 216 may include a data field 218 and a data checksum 222. In one embodiment, data field 218 may be a string of bits, such as octal or binary symbols having a structure similar to that of event field 206, although there may be only one data field 218 among a plurality of data fields 218 that actually matches event field 206. In this embodiment, event field 206 corresponds to a particular event of interest to a technician, and data bus messages 216 whose data fields 218 do not match event field 206 will be passed over until a data field 218 that matches event field 206 is found.

In one embodiment, data bus message 216 may also include a data time stamp 220 recording the time at which data bus message 216 was generated. In one embodiment, the portable data bus message logger 100 may include a clock 242 for generating data time stamp 220. In another embodiment, a vehicle clock, such as a clock associated with the control module that generated data bus message 216, may be used to generate data time stamp 220.

In one embodiment, a data bus message storage 224 may be operably connected to data bus message receiver 214 for storing data bus messages 216. This may be the case if a complete log of data bus messages 216 produced during operation of a vehicle is desired, regardless of whether any of data fields 218 of data bus messages 216 actually matched a particular event field 206.

Data bus message receiver 214 may plug into a diagnostic link or port on a bus 258 across which diagnostic messages may traverse. In various embodiments, bus 258 may be a CAN bus, a SAE J1587 bus, or a SAE J1939 bus. In one embodiment, bus 258 is a SAE J1587 bus while data bus message receiver 214 is an RS 232 connector or an RS 485 transceiver. In another embodiment, bus 258 is a SAE J1939 bus while data bus message receiver 214 is a CAN transceiver.

In various embodiments, data bus message receiver 214 may plug into a sensor output directly, or through some proxy of the sensor output such as an interpreter, a decoder, or a demultiplexer. In one embodiment, an input to data bus message receiver 214 may be derived with an inductive pickup placed along a channel, such as a cable carrying bus 258.

In a preferred embodiment, data bus message receiver 214 may receive and record data bus messages 216 without retarding substantially their delivery or interfering with them in any substantial way. This may include pulling data bus messages 216 off bus 258, recording them, and then placing a duplicate back out on bus 258. In the alternative, data bus messages 216 may be copied as they pass data bus message receiver 214. In one embodiment, partial data bus messages 216 are copied, such as data field 218 and a data checksum 222, and other data, such as padding bits, are ignored.

Event-driven portable data bus message logger 100 may also include a comparator 226 for comparing a current data field 254 of a current data bus message 228 received during operation of the vehicle to event field 206 of event message 204. If current data field 254 matches event field 206, current data bus message 228 including current data field 254 and a current data checksum 256 may be stored for later reference.

Event-driven portable data bus message logger 100 may also include a trigger 230 operably connected to comparator 226 for storing current data bus message 228, a preceding data bus message 232, and a subsequent data bus message 234 in a snapshot storage 236 if current data field 254 of current data bus message 228 is substantially similar to an event field 206 of event message 204. In one embodiment, data bus message receiver 214 may stop receiving data bus messages 216 while current data bus message 228, preceding data bus message 232, and subsequent data bus message 234 are being stored in snapshot storage 236. In this embodiment, data bus message receiver 214 may be re-initialized after current data bus message 228, preceding data bus message 232, and subsequent data bus message 234 have been stored in snapshot storage 236, and continue receiving data bus messages 216. In one embodiment, snapshot storage 236 may be a smart data storage card. In one embodiment, trigger 230 and comparator 226 are combined in a single component.

In one embodiment, parameters governing the behavior of trigger 230 may be stored in an electrically eraseable programmable read only memory (EEPROM). In another embodiment, trigger 230 may store current data bus message 228, preceding data bus message 232, and subsequent data bus message 234 in snapshot storage 236 when trigger 230 is asserted manually.

In various embodiments, a light or a buzzer may go off to alert the technician that a match has occurred. This may allow the technician to make note of the circumstances surrounding the event during which current data bus message 228 was produced, such as whether the vehicle was stopped or moving, whether the transmission was in gear, how hard the engine was pulling, and so on. The absence of a buzzer or a light may also alert the technician that the diagnostic regime the vehicle is undergoing is generating no error codes of interest. The technician may wish to stop the test in this case and try something else.

In one embodiment, the portable data bus message logger 100 may include an event captured indicator 246. Trigger 230 may assert indicator 246 when data field 218 of current data bus message 228 is substantially similar to event field 206 of event message 204. In various embodiments, indicator 246 may be a light emitting diode, a liquid crystal display, an incandescent light, a fluorescent light, a bar graph, or a buzzer.

In one embodiment, current data field 254 may be a 'fuzzy' version of an error code. In this embodiment current data field 254 may be considered a match of event field 206 even though current data field 254 does not match event field 206 exactly. This may be the case if, for example, current data field 254 is allowed to differ by one or more bits from event field 206, or be within a predetermined Hamming distance of event field 206, and still be deemed to match event field 206. This may be useful if bus 258 is a fading channel or is otherwise unreliable. This may be the case if, for example, a vehicle is operation in a location or under conditions characterized by interfering background radiation, such as when parked or traveling underneath a high-voltage power line. This may also be the case for a vehicle assigned to a military application in which jamming devices are in use.

In one embodiment, data bus message receiver 214 may be equipped with a circular buffer 260 having registers 262, 264, and 266 in which data bus messages 216 may be stored while current data field 254 is being reviewed. Although three registers are used for purposes of illustration, more or fewer registers could be used.

If current data field 254 of current data bus message 228 does not match event field 206, preceding data bus message 232 may be discarded or over-written, current data bus message 228 may be moved into register 262 that held preceding data bus message 232, subsequent data bus message 234 may be moved into register 264 that held current data bus message 228, and a new data bus messages 216 is moved into register 266 that held subsequent data bus message 234.

Figure 5:
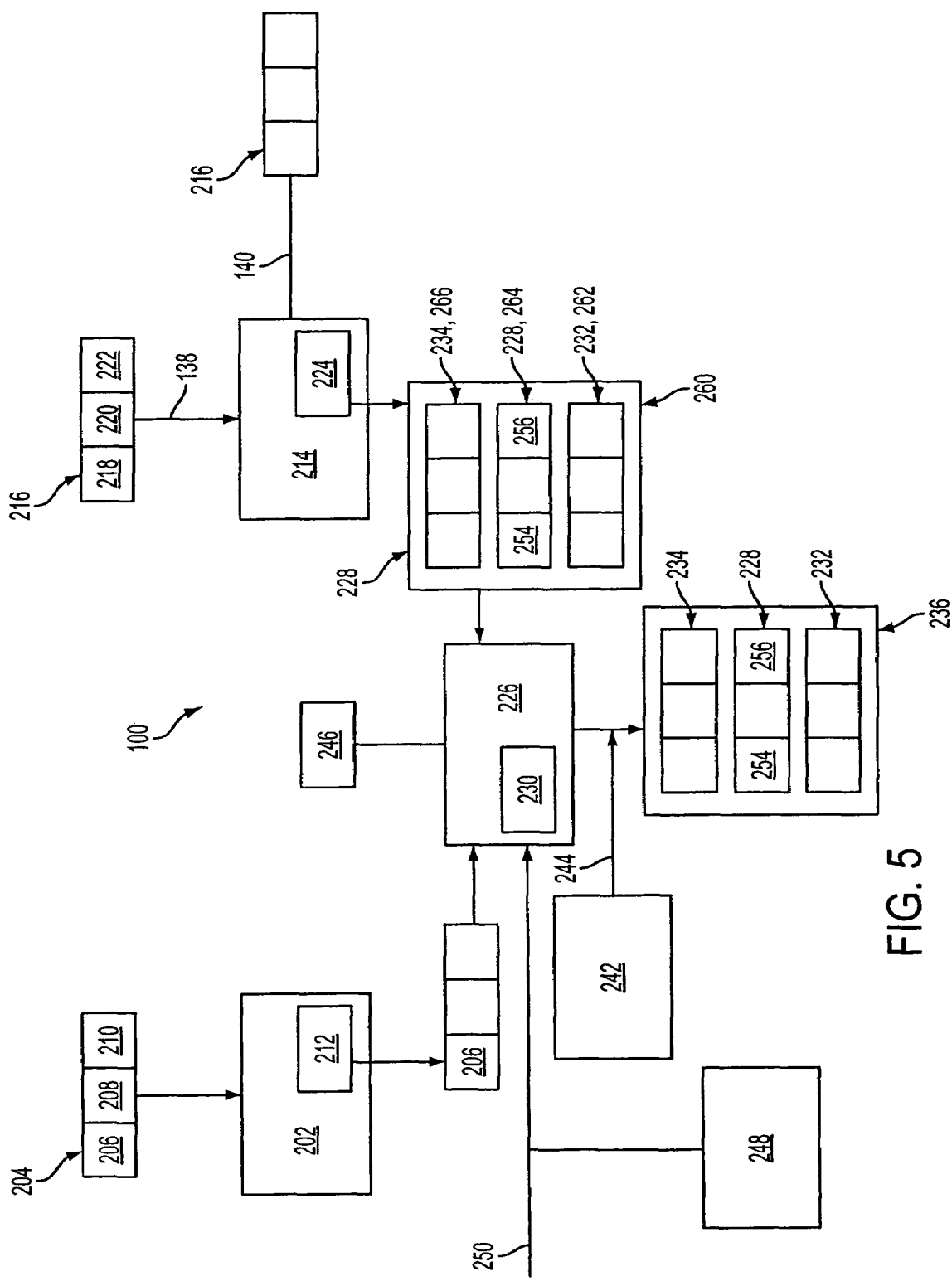
FIG. 5 is an event-driven portable data bus message logger according to a third embodiment of the invention.
Figure 6:
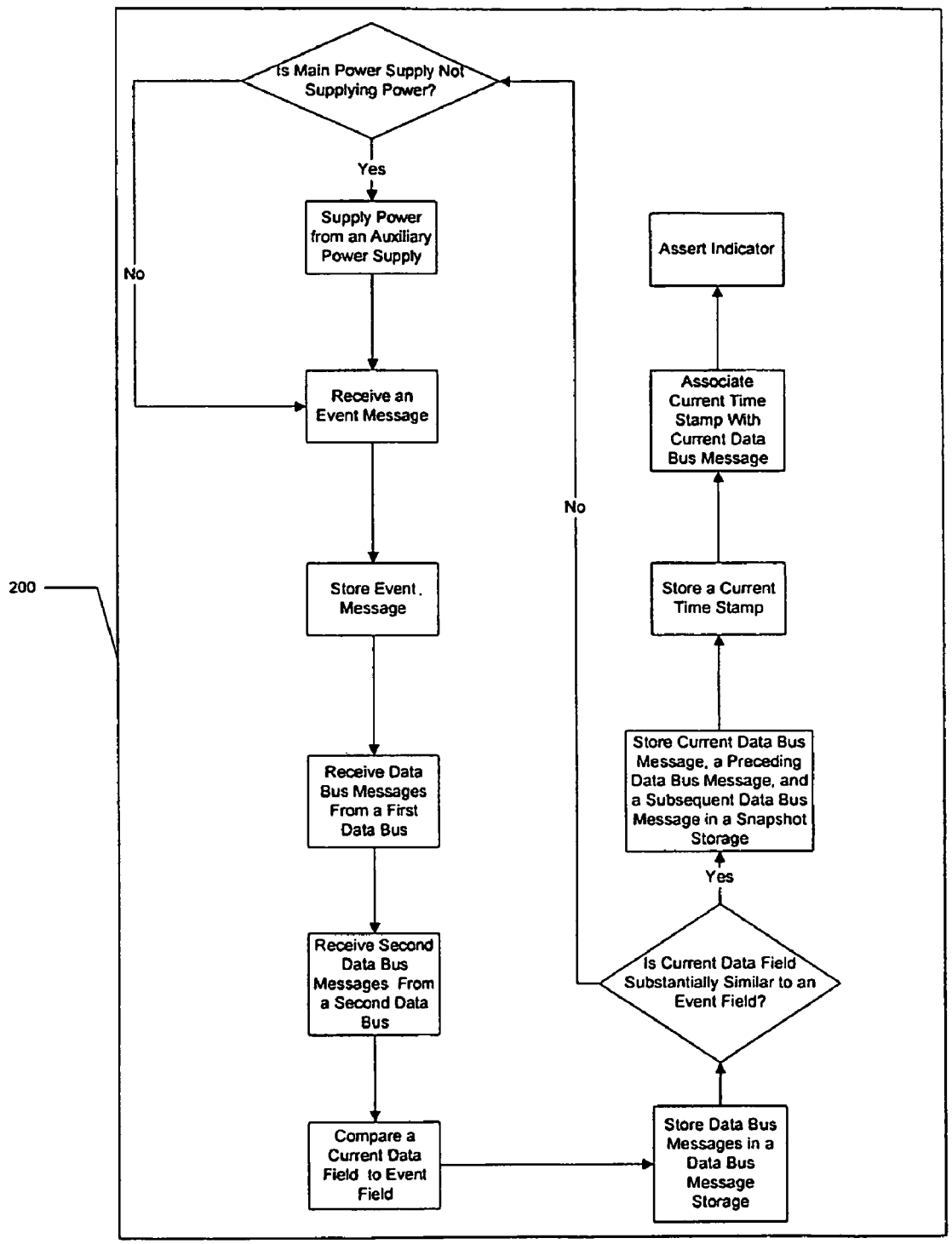
FIG. 6 is a flow diagram of a method for event-driven portable data bus message logging.

In a third embodiment, shown in FIG. 5, data bus message receiver 214 may receive data bus messages 216 from a first data bus 238 as well as a second data bus 240. In this embodiment, first and second data buses 238, 240 may be carried over physically disparate buses, or they may be channels carried over a single cable. This may be the case if, for example, first and second data buses 238, 240 are multiplexed over a common cable.

In one embodiment, first and second data buses 238, 240 may be associated with separate components or separate control modules. In this embodiment, data bus message receiver 214 may monitor two or more separate components, such as an engine and a transmission, or an exhaust gas recirculation (EGR) valve and a rate of fuel injection. This may be valuable if one component is thought to have an effect on another component, as well as speeding up data collection. While two buses are used here for purposes of illustration, more buses can be added by adding channels to data bus message receiver 214, along with the requisite buffers 260 and snapshot storage 236.

In one embodiment, the portable data bus message logger 100 may include a clock 242. Trigger 230 may store a current time stamp 244 when data field 218 of current data bus message 228 is substantially similar to event field 206 of event message 204. In one embodiment, current time stamp 244 is associated with current data bus message 228, i.e. a pointer indicates a connection between current time stamp 244 is associated current data bus message 228. In another embodiment, current time stamp 244 is stored in a current data time stamp 268 of current data bus message 228.

In one embodiment, the portable data bus message logger 100 may include an auxiliary power supply 248. Auxiliary power supply 248 may supply power to event-driven portable data bus message logger 100 when a main power supply 250 is not supplying power. In various embodiments, auxiliary power supply 248 may be a battery, a fuel cell, a voltaic pile, or a solar cell.

In a fourth embodiment of the invention, a method of event-driven portable data bus message logging 200 may include the steps of receiving an event message 204 which may include an event field 206, storing event message 204 in an event message storage 212, receiving data bus messages 216 which may include a data field 218 and a data checksum 222, comparing a current data field 254 of a current data bus message 228 to event field 206, and storing current data bus message 228, a preceding data bus message 232, and a subsequent data bus message 234 in a snapshot storage 236 if current data field 254 is substantially similar to an event field 206.

In one embodiment, method of event-driven portable data bus message logging 200 may further include the step of storing data bus messages 216 in a data bus message storage 224. In one embodiment, method of event-driven portable data bus message logging 200 may further include the step of storing a current time stamp 244 when data field 218 of current data bus message 228 is substantially similar to event field 206 of event message 204.

In one embodiment, method of event-driven portable data bus message logging 200 may further include the step of asserting indicator 246 when data field 218 of current data bus message 228 is substantially similar to event field 206 of event message 204. In one embodiment, method of event-driven portable data bus message logging 200 may further include the step of supplying power from an auxiliary power supply 248 when a main power supply 250 is not supplying power.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. An event-driven portable data bus message logger comprising:
   an event message receiver for receiving an event message including an event field;
   an event message storage operably connected to said event message receiver for storing said event message;
   a data bus message receiver for receiving data bus messages including a data field and a data checksum;
   a comparator operably connected to said event message storage and said data bus message receiver for comparing a current data field of a current data bus message to said event field; and
   a trigger operably connected to said comparator for storing said current data bus message, a preceding data bus message, and a subsequent data bus message in a snapshot storage if said current data field is substantially similar to said event field.

2. The event-driven portable data bus message logger of claim 1, wherein said data bus message receiver receives said data bus messages from a first data bus, said message logger further comprising:
   a second data bus message receiver for receiving second data bus messages including a second data field and a second data checksum from a second data bus;
   said comparator operably connected to said second data bus message receiver for comparing a current second data field of a current second data bus message to said event field; and said trigger storing said current second data bus message, a preceding second data bus message, and a subsequent second data bus message in said snapshot storage if said current second data field is substantially similar to said event field.

3. The event-driven portable data bus message logger of claim 1, wherein said current data bus message includes a current time stamp.

4. The event-driven portable data bus message logger of claim 3, further comprising a clock, said clock generating said current time stamp if said current data field is substantially similar to said event field.

5. The event-driven portable data bus message logger of claim 1, further comprising a data bus message storage operably connected to said data bus message receiver for storing said data bus messages.

6. The event-driven portable data bus message logger of claim 1, further comprising an indicator, said trigger asserting said indicator if said current data field is substantially similar to said event field.

7. The event-driven portable data bus message logger of claim 6, wherein said indicator is selected from the group consisting of: a light emitting diode; a liquid crystal display, an incandescent light, a fluorescent light, an audible indicator, a bar graph, and a buzzer.

8. The event-driven portable data bus message logger of claim 1, further comprising an auxiliary power supply, said auxiliary power supply supplying power to said event-driven portable data bus message logger when a main power supply is not supplying power.

9. The event-driven portable data bus message logger of claim 8, wherein said auxiliary power supply is selected from the group consisting of: a battery; a fuel cell, a voltaic pile, and a solar cell.

10. The event-driven portable data bus message logger of claim 1, wherein said trigger stores said current data bus message, said preceding data bus message, and said subsequent data bus message in said snapshot storage when said trigger is asserted manually.

11. The event-driven portable data bus message logger of claim 1, wherein said event field is configured to store an error code and said current data field is configured to store an error code, and said comparator is configured to determine whether an error code stored in said event field matches an error code stored in said current data field.

12. A method of event-driven portable data bus message logging, comprising:
   receiving an event message including an event field;
   storing said event message in an event message storage;
   receiving data bus messages including a data field and a data checksum;
   comparing a current data field of a current bus message to said event field; and
   storing said current data bus message, a preceding data bus message, and a subsequent data bus message in a snapshot storage, and
   asserting an indicator if said current data field is substantially similar to said event field.

13. The method of event-driven portable data bus message logging of claim 12, further comprising:
   receiving said data bus messages from a first data bus;

receiving second data bus messages including a second data field and a second data checksum from a second data bus;

comparing a current second data field of a current second data bus message to said event field; and storing said current second data bus message, a preceding second data bus message, and a subsequent second data bus message in said snapshot storage if said current second data field is substantially similar to said event field.

14. The method of event-driven portable data bus message logging of claim 12, further comprising storing said data bus messages in a data bus message storage.

15. The method of event-driven portable data bus message logging of claim 12, further comprising storing a current time stamp if said current data field is substantially similar to said event field.

16. The method of event-driven portable data bus message logging of claim 15, further comprising associating said current time stamp with said current data bus message.

17. The method of event-driven portable data bus message logging of claim 12, further comprising supplying power from an auxiliary power supply when a main power supply is not supplying power.

18. The method of claim 12 wherein said event field stores an error code and said current data field stores an error code, and said comparing step comprises determining whether said error code stored in said event field matches said error code stored in said current data field.

19. A system of event-driven portable data bus message logging, comprising:

means for receiving an event message including an event field;

means for storing said event message in an event message storage;

means for receiving data bus messages including a data field and a data checksum;

means for comparing a current data field of a current bus message to said event field; and means for storing said current data bus message, a preceding data bus message, and a subsequent data bus message in a snapshot storage if said current data field is substantially similar to said event field.

20. The system of event-driven portable data bus message logging of claim 19, further comprising:

means for receiving said data bus messages from a first data bus;

means for receiving second data bus messages including a second data field and a second data checksum from a second data bus;

means for comparing a current second data field of a current second data bus message to said event field; and means for storing said current second data bus message, a preceding second data bus message, and a subsequent second data bus message in said snapshot storage if said current second data field is substantially similar to said event field.

21. The system of event-driven portable data bus message logging of claim 19, further comprising means for storing said data bus messages in a data bus message storage.

22. The system of event-driven portable data bus message logging of claim 19, further comprising means for storing a current time stamp if said current data field is substantially similar to said event field.

23. The system of event-driven portable data bus message logging of claim 19, further comprising means for associating said current time stamp with said current data bus message.

24. The system of event-driven portable data bus message logging of claim 19, further comprising means for asserting an indicator if said current data field is substantially similar to said event field.

25. The system of event-driven portable data bus message logging of claim 19, further comprising means for supplying power from an auxiliary power supply when a main power supply is not supplying power.

26. The system of claim 19, wherein said event field is configured to store an error code and said current data field is configured to store an error code, and said comparator is configured to determine whether an error code stored in said event field matches an error code stored in said current data field.

* * * * *